United States Patent
Mooijman et al.

(10) Patent No.: US 6,938,936 B2
(45) Date of Patent: Sep. 6, 2005

(54) ENERGY ABSORBER WITH CRASH CANS

(75) Inventors: Frank Mooijman, Halsteren (NL); Dominic McMahon, Bergen op Zoom (NL); Michael Mahfet, Rochester Hills, MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/475,621

(22) PCT Filed: Sep. 12, 2001

(86) PCT No.: PCT/US01/28582
§ 371 (c)(1),
(2), (4) Date: Oct. 21, 2003

(87) PCT Pub. No.: WO03/022639
PCT Pub. Date: Mar. 20, 2003

(65) Prior Publication Data
US 2004/0145195 A1 Jul. 29, 2004

(51) Int. Cl.[7] .............................................. B60R 19/03
(52) U.S. Cl. ...................................... 293/120; 293/133
(58) Field of Search ................................ 293/102, 120, 293/132, 133, 134; 188/371, 377

(56) References Cited

U.S. PATENT DOCUMENTS

| | | | |
|---|---|---|---|
| 3,884,455 A | 5/1975 | Weller et al. | |
| 3,897,095 A | 7/1975 | Glance et al. | |
| 3,933,387 A | * 1/1976 | Salloum et al. | 293/120 |
| 3,997,207 A | 12/1976 | Norlin | |
| 4,029,350 A | * 6/1977 | Goupy et al. | 293/133 |
| 4,424,996 A | 1/1984 | Yoshiyuki | |
| 4,951,986 A | 8/1990 | Hanafusa et al. | |
| 5,056,840 A | 10/1991 | Eipper et al. | |
| 5,219,197 A | 6/1993 | Rich et al. | |
| 5,269,574 A | 12/1993 | Bhutani et al. | |
| 5,425,561 A | 6/1995 | Morgan | |
| 5,711,562 A | * 1/1998 | Terada et al. | 293/120 |
| 5,799,991 A | 9/1998 | Glance | |
| 5,984,389 A | 11/1999 | Nuber et al. | |
| 5,988,713 A | 11/1999 | Okamura et al. | |
| 6,082,792 A | 7/2000 | Evans et al. | |
| 6,179,355 B1 | 1/2001 | Chou et al. | |
| 6,247,745 B1 | 6/2001 | Carroll, III et al. | |
| 6,286,879 B1 | 9/2001 | Haque et al. | |
| 6,354,641 B1 | 3/2002 | Schroeder et al. | |
| 6,406,077 B2 | * 6/2002 | Johnson | 293/102 |
| 6,406,081 B1 | 6/2002 | Mahfet et al. | |
| 6,435,579 B1 | * 8/2002 | Glance | 293/120 |
| 6,443,513 B1 | 9/2002 | Glance | |
| 6,511,109 B1 | 1/2003 | Schultz et al. | |
| 6,575,510 B2 | * 6/2003 | Weissenborn | 293/120 |
| 6,609,740 B2 | * 8/2003 | Evans | 293/120 |
| 6,758,507 B2 | * 7/2004 | Tarahomi et al. | 293/120 |

FOREIGN PATENT DOCUMENTS

| | | |
|---|---|---|
| DE | 3020997 | 2/1982 |
| FR | 2364789 | 4/1978 |

* cited by examiner

Primary Examiner—Lori L Coletta
(74) Attorney, Agent, or Firm—Armstrong Teasdale LLP

(57) ABSTRACT

A bumper assembly (20) for an automotive vehicle is described. In an example embodiment, the assembly comprises a beam (24) and an injection molded energy absorber (22) secured to the beam. The energy absorber comprises at least one crash can (62). The assembly further comprises a fascia (26) for covering the beam and the energy absorber.

27 Claims, 5 Drawing Sheets

ENERGY ABSORBER WITH CRASH CANS

CROSS REFERENCE TO RELATED APPLICATIONS

This application claims the benefit of International Application No. PCT/US01/28582 filed Sep. 12, 2001.

BACKGROUND OF THE INVENTION

This invention relates generally to bumpers and, more particularly, to energy absorbing vehicle bumper systems.

Bumpers typically extend widthwise across the front and rear of a vehicle and are mounted to rails that extend in a lengthwise direction. Energy absorbing bumper systems attempt to reduce vehicle damage as a result of a collision by managing impact energy and intrusion while not exceeding a rail load limit of the vehicle. The efficiency of an energy absorber is defined as the amount of energy absorbed over distance. A high efficiency energy absorber absorbs more energy over a shorter distance than a low energy absorber. High efficiency is achieved by building load quickly to just under the rail load limit and maintaining that load constant until the impact energy has been dissipated.

Increasing the stiffness of an energy absorber generally increases the efficiency of the absorber since a stiff energy absorber builds load more quickly than a less stiff absorber. In addition, there generally is less intrusion with a stiff energy absorber than with a less stiff energy absorber. Increasing the stiffness of the energy absorber, however, can result in an undesirable increase in the weight of the bumper system. Specifically, a more stiff energy absorber generally is heavier than a less stiff absorber.

Some known energy absorbing bumper systems include a foam resin, such as described in U.S. Pat. No. 4,762,352 and U.S. Pat. No. 4,941,701. Foam based systems typically have slow loading upon impact, which results in a high displacement. Further, foams are effective to a sixty or seventy percent compression, and beyond that point, foams become incompressible so that the impact energy is not fully absorbed. The remaining impact energy is absorbed through deformation of a backup beam and/or vehicle structure. Foams are also temperature sensitive so that displacement and impact absorption behavior can change substantially with temperature. Typically, as temperature is lowered, foam becomes more rigid, resulting in higher loads. Conversely, as temperature rises, foams become more compliant resulting in higher displacements and possible vehicle damage.

Some known bumper systems include crash cans. The crash cans are separately fabricated and attached directly to the beam in alignment with the vehicle rails. The crash cans absorb energy during impact, e.g., an offset impact, and facilitate preventing damage to the beam. Separately fabricating and attaching the crash cans to the beam, however, increases bumper assembly costs and complexity.

BRIEF SUMMARY OF THE INVENTION

In one aspect, a bumper assembly for an automotive vehicle is provided. The bumper assembly comprises a beam and an injection molded energy absorber secured to the beam. The energy absorber comprises at least one crash can. The assembly further comprises a fascia for covering the beam and the energy absorber.

In another aspect, an energy absorber for a bumper assembly is provided. The energy absorber comprises a frame and a body extending from the frame. The body comprises a first transverse wall, a second transverse wall spaced from the first wall, and at least one crash can between the first and second walls.

DETAILED DESCRIPTION OF THE INVENTION

Figure 1:
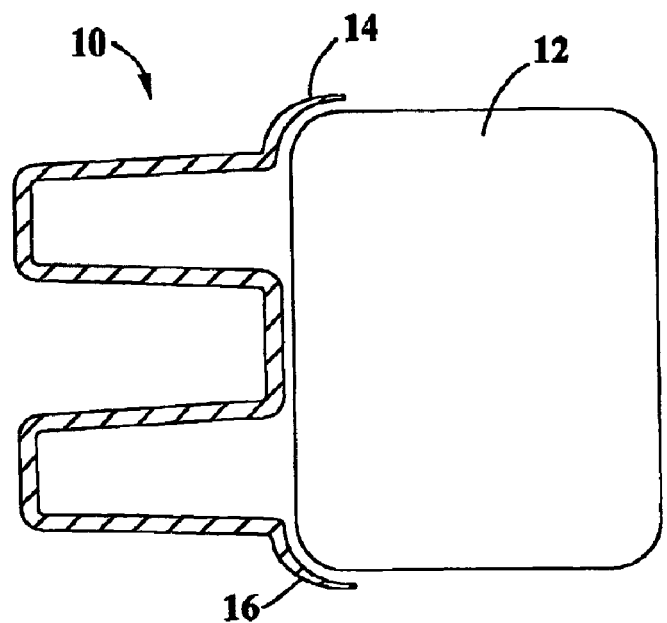
FIG. 1 is a cross-sectional view of a known energy absorber shown in a pre-impact condition.

A bumper system that includes an energy absorber of the non-foam type with crash cans is described below in detail. The crash cans are sometimes described herein as being integral with the energy absorber. The term integral means that the crash cans are formed as a component of, and not separately from, the energy absorber, which results in a one-piece unitary structure for the energy absorber. While the crash can be separate from the energy absorber, as described below in more detail, a one piece, unitary energy absorber including the crash cans is believed to facilitate manufacturing as well as assembly of the energy absorber to a bumper rail.

Combining a non foam type energy absorber with crash cans results in a bumper system that achieves fast loading and efficient energy absorption upon impact. Specifically, impact forces during low speed and high speed impacts are maintained just below a predetermined level by deforming the energy absorber and beam until the kinetic energy of the impact event has been absorbed. When the low speed impact is over, the energy absorber returns substantially to its original shape and retains sufficient integrity to withstand subsequent impacts.

Further, combining the efficient energy absorbing properties of a thermoplastic energy absorber with the integrated crash cans is believed to provide improved impact absorbing performance over traditional metal beams with foam energy absorbers. In addition, the thermoplastic energy absorber with integrated crash cans is believed to provide more efficient impact absorption than steel beams with a thermoplastic energy absorbers that do not include crash cans.

The energy absorber also achieves efficient energy absorption upon impact with a lower leg. Specifically, impact forces and impactor geometry during impacts (e.g., 40 Km/hr impacts) can be maintained within predetermined levels by deforming the energy absorber in a controller manner. Once the impact is over, the absorber returns substantially to its original shape and retains sufficient integrity to withstand subsequent impacts. Such an arrangement provides lower leg pedestrian impact protection.

Further, the energy absorber can be packaged in a small space as compared to conventional foam systems. The automotive designers therefore have enhanced freedom to style bumpers while achieving pedestrian impact requirements. Also, since the energy absorbing system can be unitary and integrally molded thermoplastic engineering resin, the energy absorbing system can be easily recycled. Greater consistency also is achieved over varied temperatures, in comparison to foam systems. In addition, the energy absorber provides a smooth, predictable loading response regarding of the impact direction.

Although the bumper system is described below with reference to specific materials (e.g., Xenoy® material (commercially available from General Electric Company, Pittsfield, Mass.) for the energy absorber), the system is not limited to practice with such materials and other materials can be used. In addition, the beam need not necessarily be a steel beam, and other materials and fabrication techniques can be utilized. Generally, the energy absorber is selected from materials that result in efficient energy absorption, and the beam materials and fabrication technique are selected to result in a stiff beam.

Figure 2:
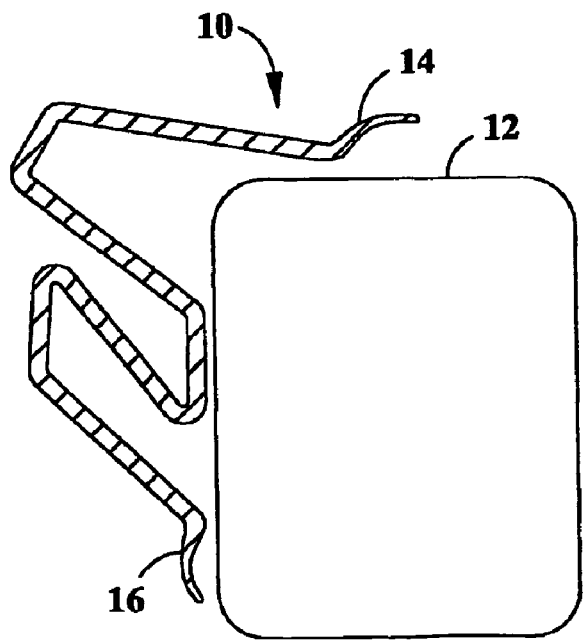
FIG. 2 is a cross-sectional view of a known energy absorber shown in a post-impact condition.

Referring now specifically to the drawings, FIGS. 1 and 2 are cross-sectional views a known energy absorber 10 as used in association with a reinforcing beam 12. Energy absorber 10 includes upper and lower flanges 14 and 16, respectively, which upon installation overlap a portion of beam 12. As shown in FIG. 2, absorber 10 tends to buckle as opposed to absorbing and dissipating the impact energy resulting from a collision.

Figure 3:
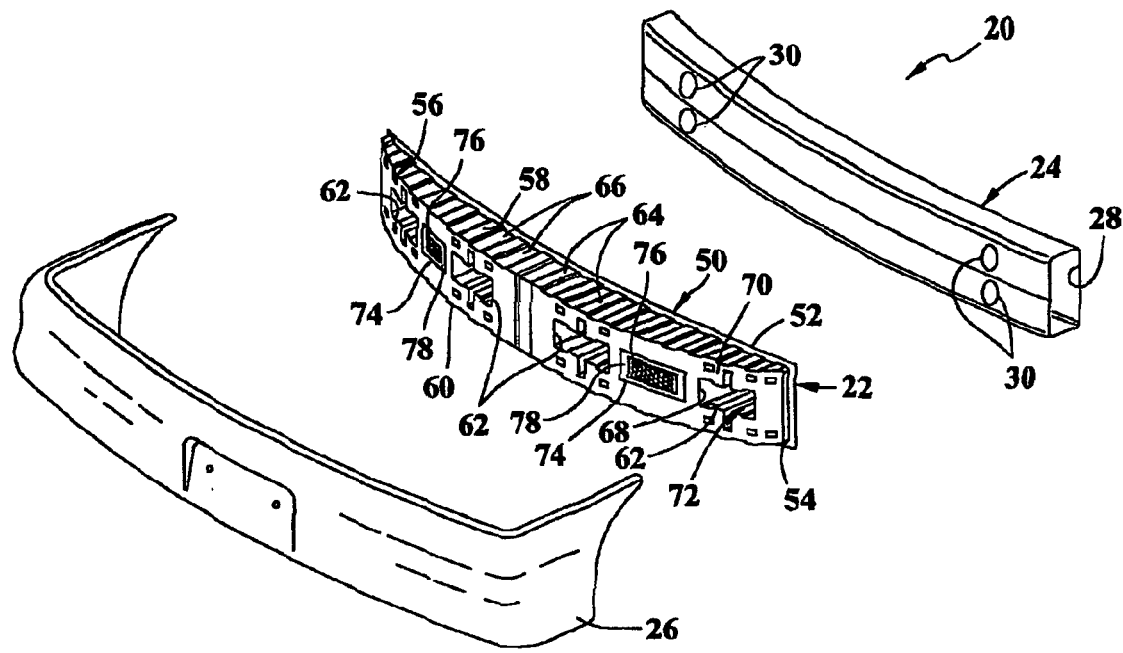
FIG. 3 is an exploded perspective view of one embodiment of a bumper assembly including a beam and injection molded energy absorber.

FIG. 3 is an exploded perspective view of one embodiment of a bumper system 20. System 20 includes an energy absorber 22 and a beam 24. Energy absorber 22 is positioned between beam 24 and a fascia 26 which, when assembled, form a vehicle bumper. As should be understood by those skilled in the art, beam 24 is attached to lengthwise extending frame rails (not shown).

Fascia 26 is formed from a thermoplastic material which is amenable to finishing utilizing conventional vehicle painting and/or coating techniques. Fascia 26 envelops both energy absorber 22 and beam 24 such that neither component is visible once attached to the vehicle.

Beam 24, in the example embodiment, is steel and has a rectangular cross sectional shape. Beam 24 is hollow, i.e., a channel 28 extends through beam 24, and includes openings 30 for securing beam 24 to the frame rails of the vehicle, as described below in more detail. Rather than steel, beam 24 could, for example, be fabricated from a glass mat thermoplastic (GMT) or another plastic that provides a strength and stiffness required for a particular bumper application.

Energy absorber 22 includes a frame 50 having first and second longitudinally extending flanges 52 and 54, respectively, which overlap beam 24. Absorber 22 further includes a body 56 that extends outward from frame 50, and body 56 includes a first transverse wall 58 and a second transverse wall 60 having a plurality of tunable crush boxes 62 extending therebetween. Transverse walls 58, 60 are rippled including alternating raised areas 64 and depressed areas 66 which provide transverse walls 58, 60 with added stiffness to resist deflection upon impact. The width and depth dimensions of the ripples can be modified to achieve different stiffness characteristics as desired. Crush boxes 62 include side walls 68, an outer wall 70, and open areas 72 that extend to inner frame 50.

In addition to crush boxes 62, crash cans 74 are between walls 58 and 60 and are positioned to align (axially) with the vehicle rails. Crash cans 74 include, in the example embodiment, honeycomb shaped structures 76 and open areas 78 that extend to frame 50.

Figure 4:
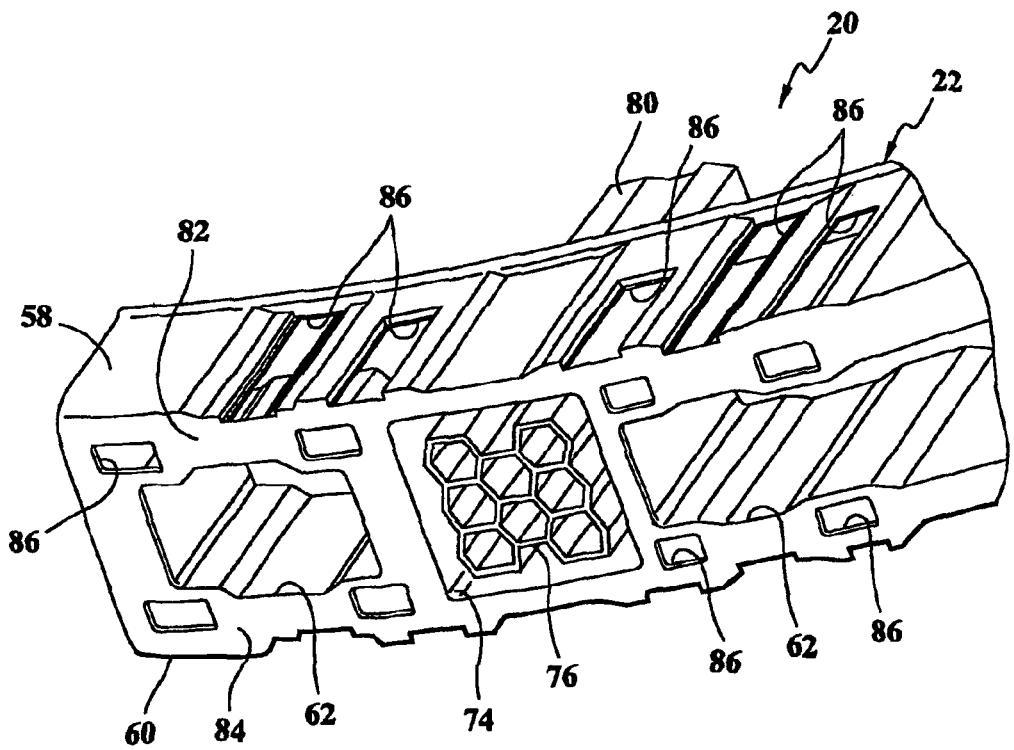
FIG. 4 is a perspective view of a portion of the bumper assembly shown in FIG. 3.

Referring to FIG. 4, which is a perspective view of a portion of bumper assembly 20, crash can 74 is aligned with rail 80 of a vehicle, and is positioned between crush boxes 62. Crush boxes 62 can have any one of a number of different geometries depending on the impact energy requirements for the vehicle. Example crush boxes 62 have an overall three-dimensional I-shape including a wing or top portion 82 adjacent first transverse wall 58 and a bottom wing portion 84 adjacent second transverse wall 60.

Crash cans 74 also can have any one of a number of different geometries depending on the impact energy requirements for the vehicle. Example crash cans 74 have an overall square dimensional shape with honeycomb shaped structure 76 therein. Crash cans 74 facilitate absorbing energy during an offset impact, i.e., when the impact involves only a portion of bumper assembly 20. Crash cans 74 also provide a stiffness tunability in order to meet the desired impact load deflection criteria. That is, modifications can be made to crash cans 74 for any given application in an effort to meet the targeted criteria. For example, the spacing between the walls and the size of honeycomb structure 76 can be selected depending on the particular application.

The tunability of crash cans 74 can also be tailored for specific applications by varying the wall thickness. For example, the nominal thickness of the walls may broadly range from about 1.75 mm to about 3.0 mm. More specifically, for certain low impact applications the nominal wall thickness may generally range from about 1.75 mm to about 2.0 mm and for other applications the walls would more likely be in the range of about 2.5 mm to 3.0 mm.

Crush boxes 62 of energy absorber 22 stabilize energy absorber 22 during an impact event. In this regard, crush boxes 62 provide for an axial crush mode in both barrier and pendulum impacts according to Federal Motor Vehicle Safety Standard (FMVSS) and Canadian Motor Vehicle Safety Standard (CMVSS). Crush boxes 62 also provide a stiffness tunability in order to meet the desired impact load deflection criteria. That is, modifications can be made to crush boxes 62 for any given application in an effort to meet the targeted criteria. For example, crush boxes 62 include a plurality of windows 86. Windows 86 can be configured to have one of many different shapes depending on the particular application.

The tunability of crush boxes 62 can also be tailored for specific applications by varying the side and rear wall thickness. For example, for the nominal wall thickness of the side and the outer wall may broadly range from about 1.75 mm to about 3.0 mm. More specifically, for certain low impact applications the nominal wall thickness may generally range from about 1.75 mm to about 2.0 mm and for other applications, particularly those for a 5 mph FMVSS or CMVSS system, the nominal wall thickness for the side and rear walls would more likely be in the range of about 2.5 mm to 3.0 mm.

Another aspect in appropriately tuning energy absorber 22 is the selection of the thermoplastic resin to be employed. The resin employed may be a low modulus, medium modulus or high modulus material as needed. By carefully considering each of these variables, energy absorbers meeting the desired energy impact objectives can be manufactured.

More specifically, the characteristics of the material utilized to form energy absorber 22 include high toughness/ ductility, thermally stable, high energy absorption capacity, a good modulus-to-elongation ratio and recyclability. While the energy absorber may be molded in segments, the absorber also can be of unitary construction made from a tough plastic material. An example material for the absorber is Xenoy, as referenced above. Of course, other engineered thermoplastic resins can be used. Typical engineering thermoplastic resins include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile(ethylene-polypropylene diamine modified)-styrene (ABS), phenylene ether resins, blends of polyphenylene ether/polyamide (NORYL GTX® from General Electric Company), blends of polycarbonate/PET/PBT, polybutylene terephthalate and impact modifier (XENOY® resin from General Electric Company), polyamides, phenylene sulfide resins, polyvinyl chloride PVC, high impact polystyrene (HPS), low/high density polyethylene (l/hdpe), polypropylene (pp) and thermoplastic olefins (tpo).

Figure 5:
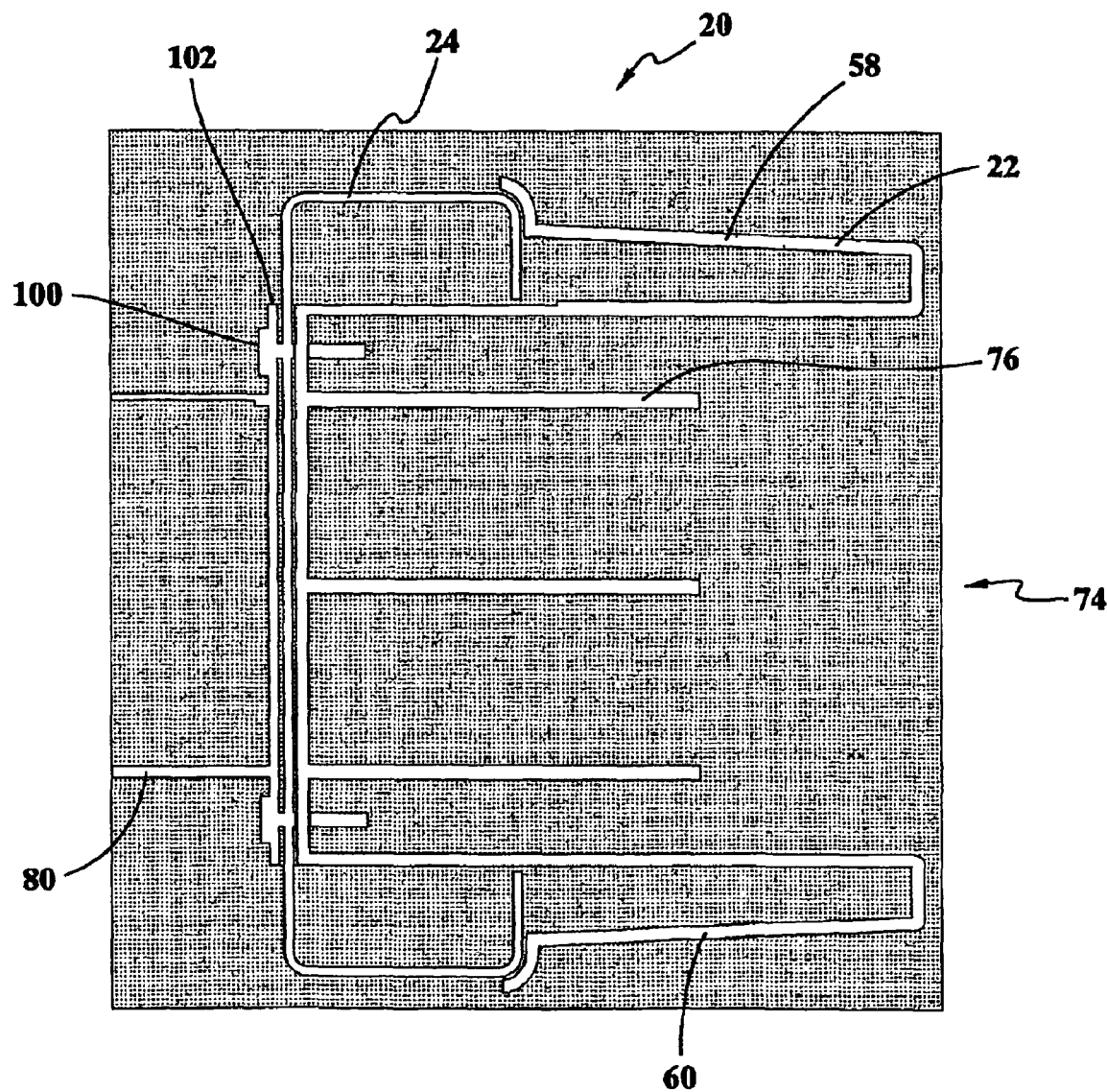
FIG. 5 is a cross-sectional view of the bumper assembly shown in FIG. 3.

FIG. 5 is a cross-sectional view of the bumper assembly 20 secured to rail 80. As shown in FIG. 5, bolts 100 extend through openings in a mounting plate 102 welded to rail 80, as well as through openings 30 in beam 24 and openings in energy absorber 22. Bumper assembly 20, including integral crash cans 74, therefore is easily and readily secured to rails 80 without requiring separate alignment and attachment of crash cans 74.

Figure 6:
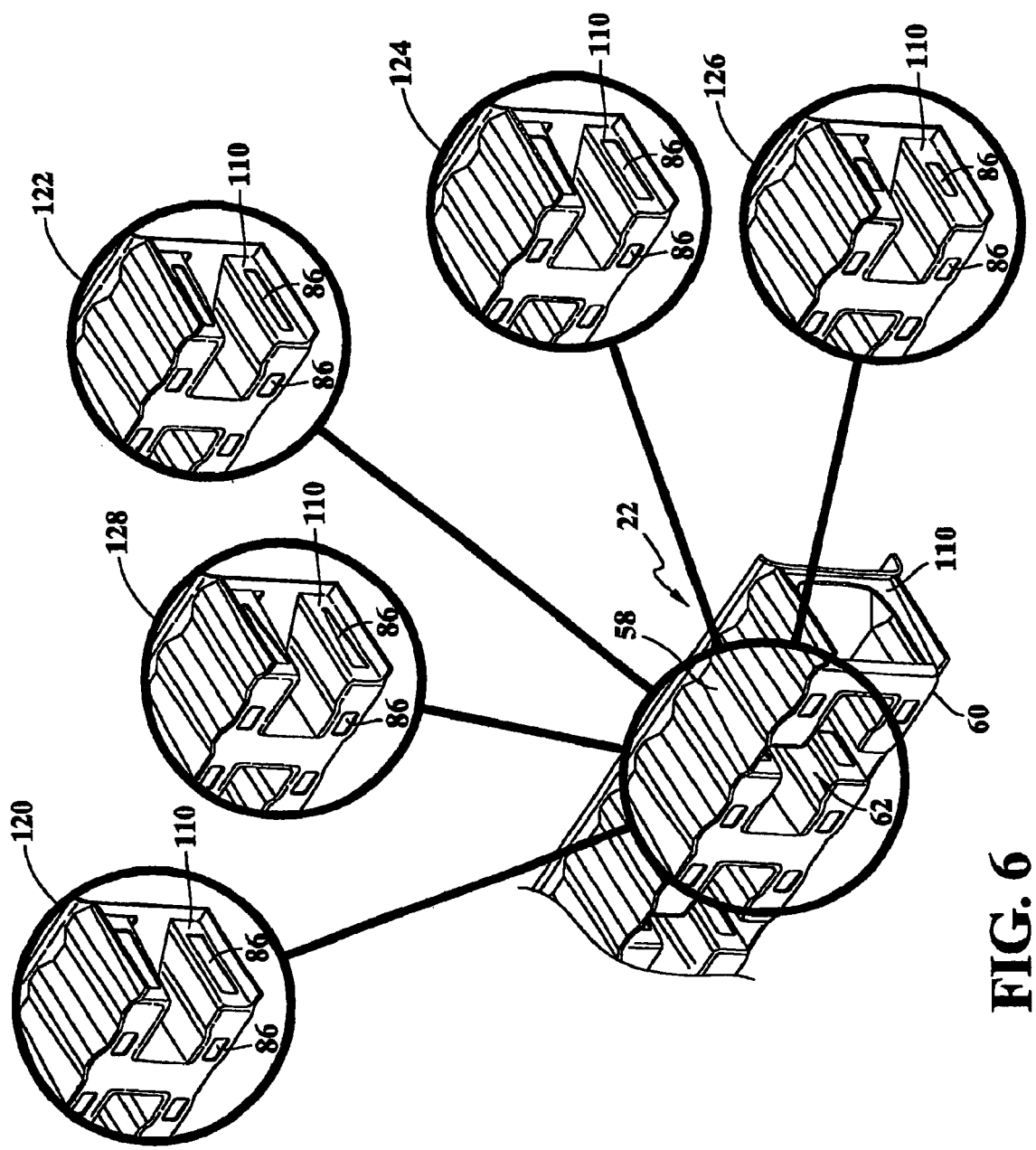
FIG. 6 is a perspective view of an energy absorber with magnified partial perspective views of alternative window arrangements.

FIG. 6 is a perspective view of a portion of energy absorber 22 illustrating magnified partial perspective views of alternative window arrangements. As illustrated in FIG. 6, integrally molded connecting members 110 extend vertically between the first and second transverse walls 58 and 60, respectively. Connecting members 110 may be in the form of vertically extending posts or may have a cross shaped structure including both a vertically extended posts and horizontally extending posts. Regardless of the configuration of connecting members 110, connecting member 110 may have a minimum average width to height ratio of 1:5 along the inner wall of the vertically extending post, the height being measured as the distance between the first and second traverse walls 58 and 60, respectively. If connecting member 110 includes windows 86 the width to height ratio is 1:3.

As shown in FIG. 6 and with respect to the tunability of crush boxes 62, windows 86 can be, but are not limited to, squares and rectangles of different dimensions as shown at 120, 122, 124, 126 and tear drop shapes as shown at 128 in order to achieve the desired stiffness of the crush box. To form the windows, a typical mold will include approximately a 5° open draft angle so as to obtain suitable manufacturing conditions.

As explained above, integrating crash cans with an injection molded thermoplastic energy absorber coupled to a stiff beam is believed to provide enhanced energy absorption efficiency. Enhanced impact performance translates to reduced costs of repair for low speed "fender benders" and reduced vehicle damage during higher speed collisions. Further, since foam is not utilized, it is believed that greater consistency of impact performance may be achieved over varied temperatures.

Rather than integrating the crash cans with the thermoplastic energy absorber, it is contemplated that the crash cans can be formed separate from the energy absorber and either attached to, e.g., press or snap fit, welded, to the energy absorber or with the bumper rail. Separate fabrication of the energy absorber and crash cans provides an advantage in that the crash cans can then more readily be fabricated using materials different from the material used to fabricate the energy absorber. Of course, various attachment techniques other than a press fit or snap fit (e.g., bolts) can be used to secure the crash cans to the energy absorber or rail.

Figure 7:
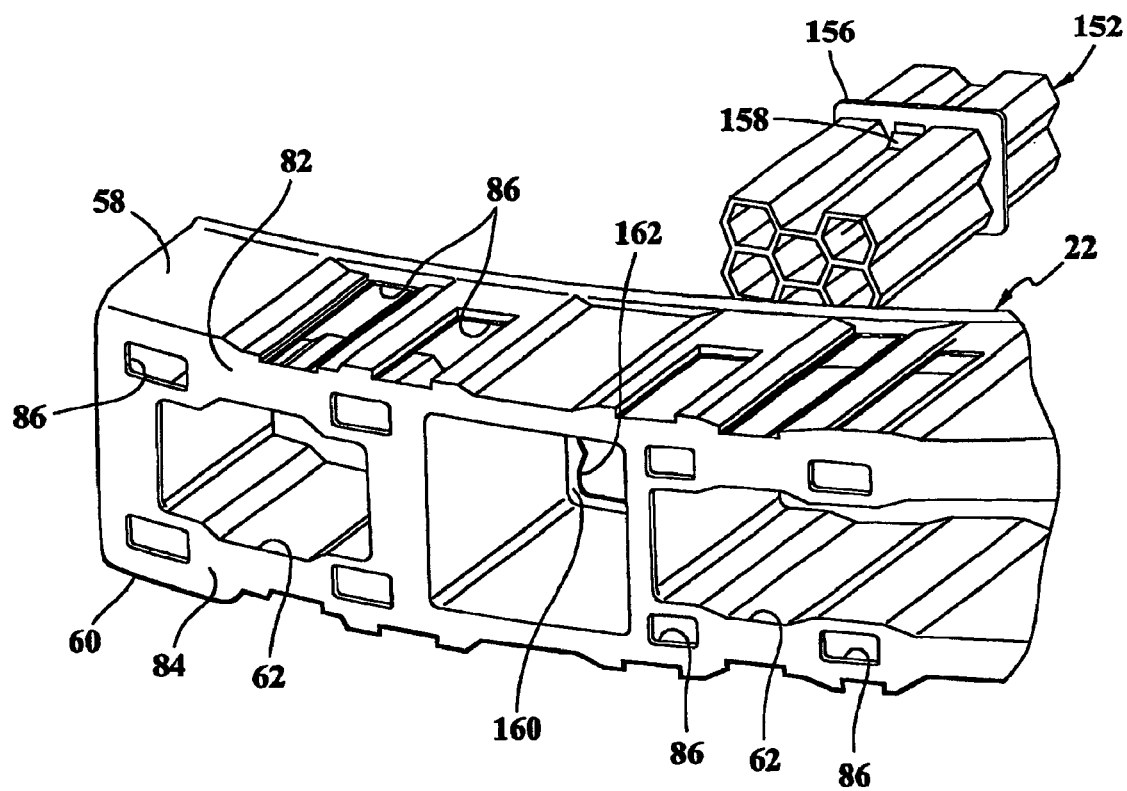
FIG. 7 is a perspective view of a portion of a bumper assembly including a snap fit crash can.
Figure 8:
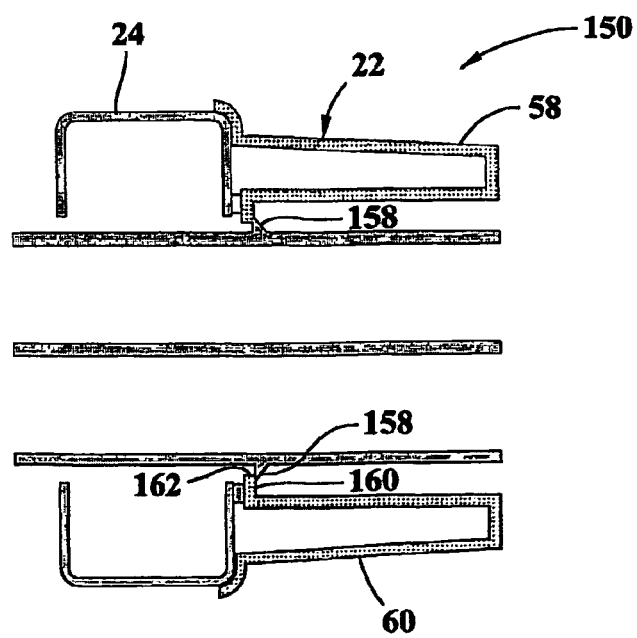
FIG. 8 is a cross-sectional view of the bumper assembly shown in FIG. 7.

For example, and referring to FIGS. 7 and 8 which are a perspective view of a portion of a bumper assembly 150 including a snap fit crash can 152 and a cross-sectional view of bumper assembly 150, respectively, components in FIGS. 7 and 8 identical to components in FIG. 4 are identified in FIGS. 7 and 8 using the same reference numerals in FIG. 4. As shown in FIGS. 7 and 8, a honeycomb structure 154 (i.e., crash can 154) includes a flange 156 and a snap 158 spaced from flange 156. Energy absorber 22 also includes a wall 160 having an opening 162 therethrough, and opening 162 is sized so that structure 152 can be partially inserted therethrough. Crash can 152 is inserted through opening 162 until flange 156 abuts wall 160. Snap 158 snaps over wall 160 so that wall 160 is trapped between snap 158 and flange 156.

Of course, other attachment techniques can be used to attach crash cans to an energy absorber. For example, the crash cans can be press fit or vibration welded to the energy absorber. FIGS. 7 and 8 illustrate just one example of how separately fabricated crash cans can be secured to an energy absorber.

The combination of the tunable crash cans and the tunable crush boxes with the energy absorber provides an efficient, fast loading and controlled impact event. This high efficiency is believed to result in facilitating reducing vehicle bumper offsets without increasing the loads transferred to the vehicle structure.

While the invention has been described in terms of various specific embodiments, those skilled in the art will recognize that the invention can be practiced with modification within the spirit and scope of the claims.

What is claimed is:

1. A bumper assembly comprising:
   a beam;
   an injection molded energy absorber secured to said beam, said energy absorber comprising:
      at least one crash can, each said crash can comprising a resilient structure positioned in an opening extending through said energy absorber;
      a flanged frame for attachment to said beam; and
      a body extending from said frame, said body comprising a first transverse wall and a second transverse wall spaced from said first wall; and
   a fascia for covering at least a portion of said beam and said energy absorber.

2. A bumper assembly according to claim 1 wherein said beam is at least one of steel and a thermoplastic.

3. A bumper assembly according to claim 1 further wherein said energy absorber comprises a unitary elongated thermoplastic member adapted for attachment to a vehicle, said crash can being integral with said energy absorber.

4. A bumper assembly according to claim 1 wherein said crash can is attached to said energy absorber.

5. A bumper assembly according to claim 1 wherein said energy absorber comprises a first crash can between said first and second transverse walls and aligns with a first vehicle rail.

6. A bumper assembly according to claim 5 wherein said energy absorber comprises a second crash can between said first and second transverse walls and aligns with a second vehicle rail.

7. A bumper according to claim 1 wherein said first and second transverse walls are rippled.

8. A bumper assembly according to claim 1 wherein said energy absorber comprises at least one crush box between said first and second transverse walls.

9. A bumper assembly according to claim 8 wherein a plurality of crush boxes are spaced apart along the body and have open areas disposed therebetween.

10. A bumper assembly according to claim 8 wherein said crush box has an overall three dimensional I-shape and wherein said crush box comprises at least one window.

11. A bumper assembly according to claim 1 wherein said crash can comprises a honeycomb structure.

12. A bumper assembly according to claim 1 wherein said energy absorber is configured to maintain impact forces below a predetermined level upon impact below a predetermined speed with a lower leg.

13. An energy absorber, comprising:
   a frame;
   a body extending from said frame, said body comprising a first transverse wall, a second transverse wall spaced from said first wall; and
   at least one crash can between said first and second walls, each said crash can comprising a resilient structure positioned in an opening extending through said energy absorber.

14. An energy absorber according to claim 13 wherein said frame, said body, and said crash can are injection molded.

15. An energy absorber according to claim 13 wherein said crash can is integral with said frame and said body.

16. An energy absorber according to claim 13 comprising a first crash can between said first and second transverse walls and configured to align with a first vehicle rail, and a second crash can between said first and second transverse walls and configured to align with a second vehicle rail, and wherein said first and second transverse walls are rippled.

17. An energy absorber according to claim 13 wherein said energy absorber comprises at least one crush box between said first and second transverse walls.

18. An energy absorber according to claim 13 wherein a plurality of crush boxes are spaced apart along said body and have open areas disposed therebetween.

19. An energy absorber according to claim 13 wherein said crash can comprises a honeycomb structure.

20. An energy absorber according to claim 13 wherein said crash can is attached to at least one of said frame and said body.

21. An energy absorber according to claim 13 wherein said energy absorber is configured to maintain impact forces below a predetermined level upon impact below a predetermined speed with a lower leg.

22. A bumper assembly comprising an energy absorber, said energy absorber comprising a unitary elongated thermoplastic member adapted for attachment to a vehicle, and at least one crash can, each said crash can comprising a resilient structure positioned in an opening extending through said energy absorber.

23. A bumper assembly according to claim 22 further comprising a beam, said energy absorber secured to said beam, and a fascia for covering at least a portion of said beam and said energy absorber.

24. A bumper assembly according to claim 22 wherein said crash can is integral with said energy absorber.

25. A bumper assembly according to claim 22 wherein said crash can is attached to said energy absorber.

26. A bumper assembly according to claim 25 wherein said crash can is attached to said energy absorber by at least one of a snap fit, a press fit, and a weld.

27. A bumper assembly according to claim 22 wherein said energy absorber is configured to maintain impact forces below a predetermined level upon impact below a predetermined speed with a lower leg.

* * * * *